No. 801,323. PATENTED OCT. 10, 1905.
H. A. KISER & C. P. ANDERS.
REVERSING GEAR FOR MOTOR DRIVEN VEHICLES.
APPLICATION FILED SEPT. 12, 1904.

4 SHEETS—SHEET 1.

WITNESSES:

INVENTORS.

ATTORNEYS.

No. 801,323. PATENTED OCT. 10, 1905.
H. A. KISER & C. P. ANDERS.
REVERSING GEAR FOR MOTOR DRIVEN VEHICLES.
APPLICATION FILED SEPT. 12, 1904.

4 SHEETS—SHEET 2.

WITNESSES
INVENTORS
Hubert A. Kiser
Christian P. Anders
BY
Erwin & Wheeler
ATTORNEYS.

No. 801,323.  
PATENTED OCT. 10, 1905.  
H. A. KISER & C. P. ANDERS.  
REVERSING GEAR FOR MOTOR DRIVEN VEHICLES.  
APPLICATION FILED SEPT. 12, 1904.

4 SHEETS—SHEET 3.

WITNESSES:

INVENTORS.
Herbert A. Kiser
Christian P. Anders
BY
ATTORNEYS.

No. 801,323. PATENTED OCT. 10, 1905.
H. A. KISER & C. P. ANDERS.
REVERSING GEAR FOR MOTOR DRIVEN VEHICLES.
APPLICATION FILED SEPT. 12, 1904.

4 SHEETS—SHEET 4.

WITNESSES:
INVENTORS.
Herbert A. Kiser
Christian P. Anders
BY
Erwin & Wheeler
ATTORNEYS.

UNITED STATES PATENT OFFICE.

HUBERT A. KISER AND CHRISTIAN P. ANDERS, OF WESTOVER, SOUTH DAKOTA.

REVERSING-GEAR FOR MOTOR-DRIVEN VEHICLES.

No. 801,323.           Specification of Letters Patent.           Patented Oct. 10, 1905.

Application filed September 12, 1904. Serial No. 224,122.

*To all whom it may concern:*

Be it known that we, HUBERT A. KISER and CHRISTIAN P. ANDERS, citizens of the United States, residing at Westover, county of Lyman, and State of South Dakota, have invented new and useful Improvements in Reversing-Gear for Motor-Driven Vehicles, of which the following is a specification.

Our invention relates to improvements in traction-engines; and it pertains to that class in which the engine is driven with gasolene or other similar explosive fluids.

The object of our invention is to provide a simple and efficient device by which the direction of the vehicle may be reversed and the same driven either forwardly or backwardly without reversing the movement of the engine.

It is a well-known fact that all ordinary engines operated by an explosive fluid are adapted to be driven in one direction only, while it is important to reverse the direction of the vehicles which are driven thereby.

The construction of our invention is further explained by reference to the accompanying drawings, in which—

Figure 1:
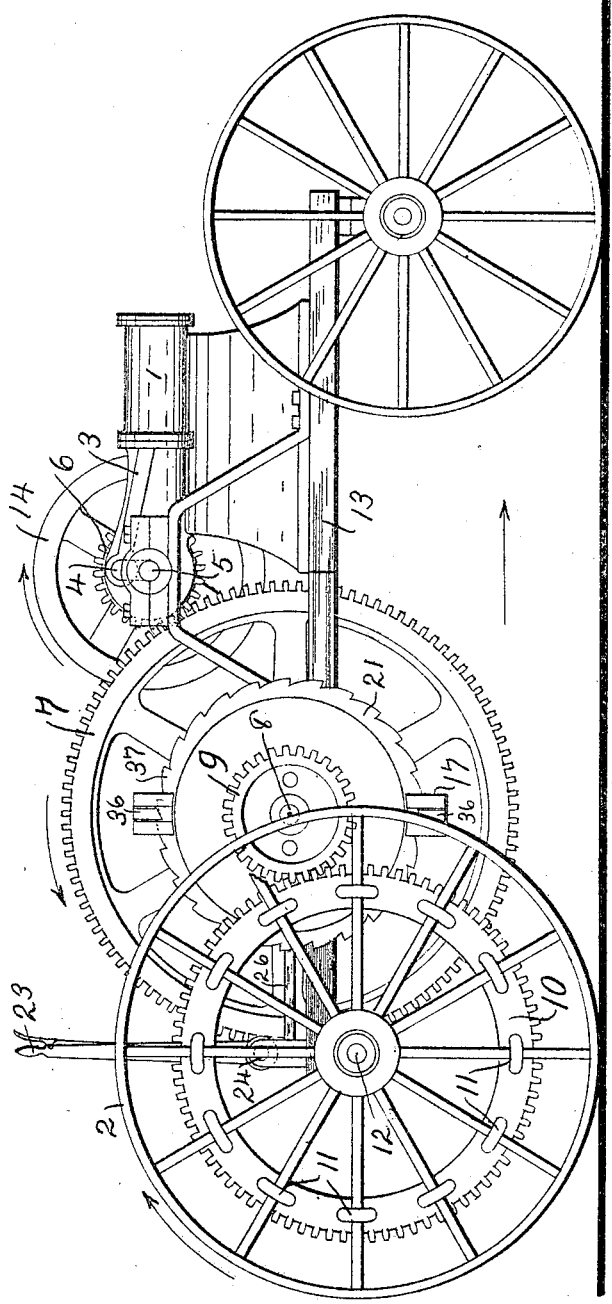
Figure 2:
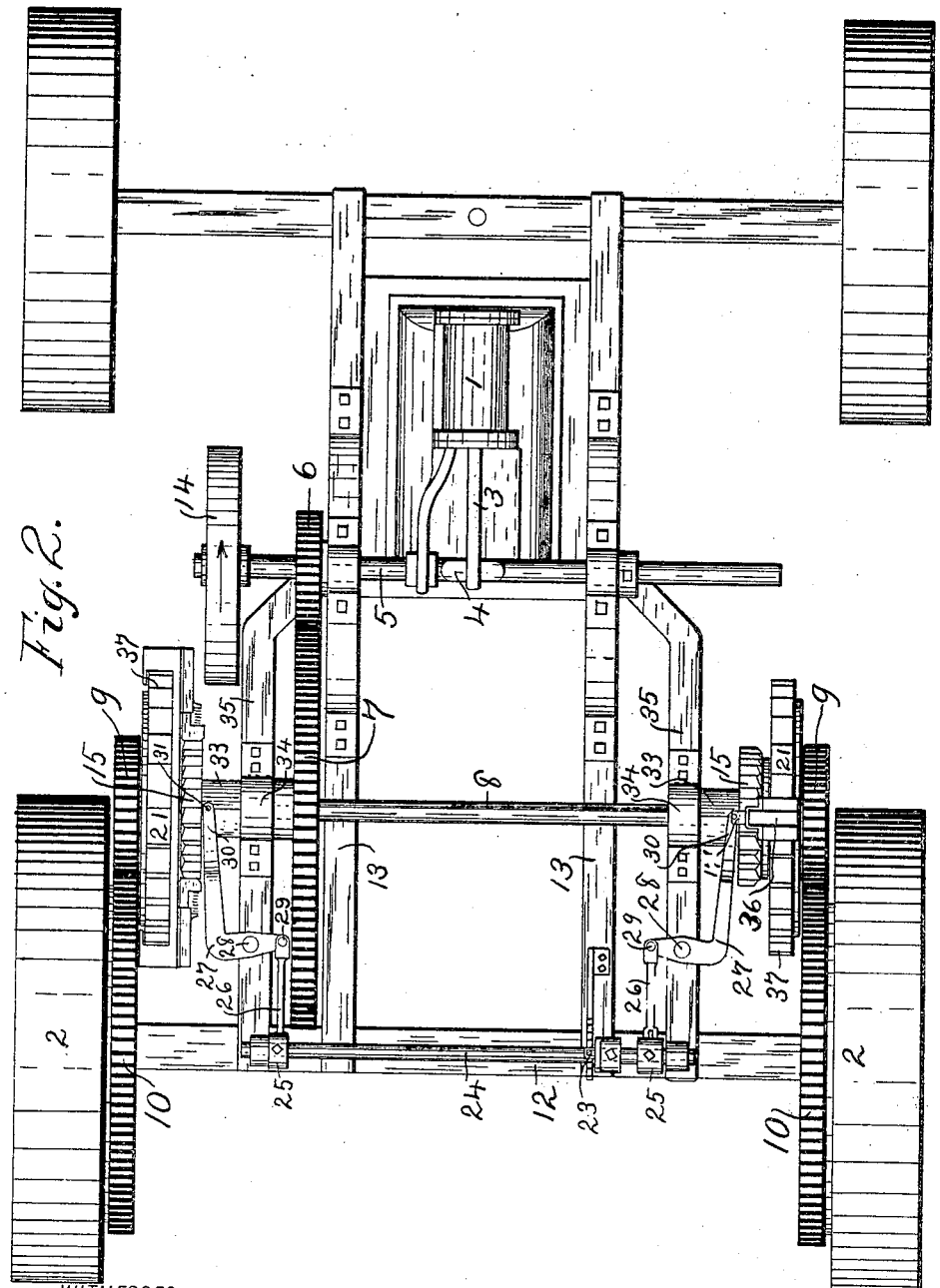
Figure 3:
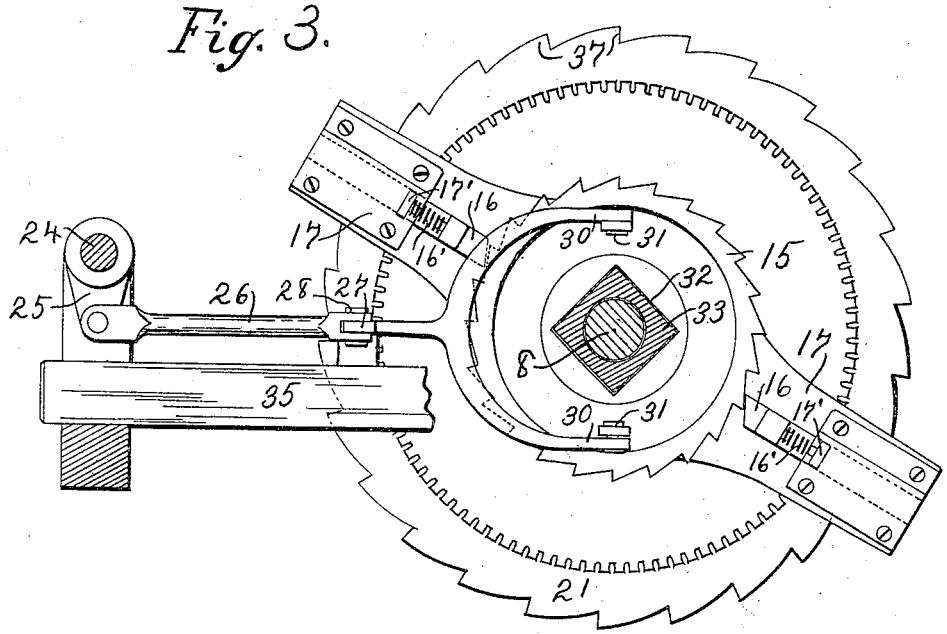
Figure 4:
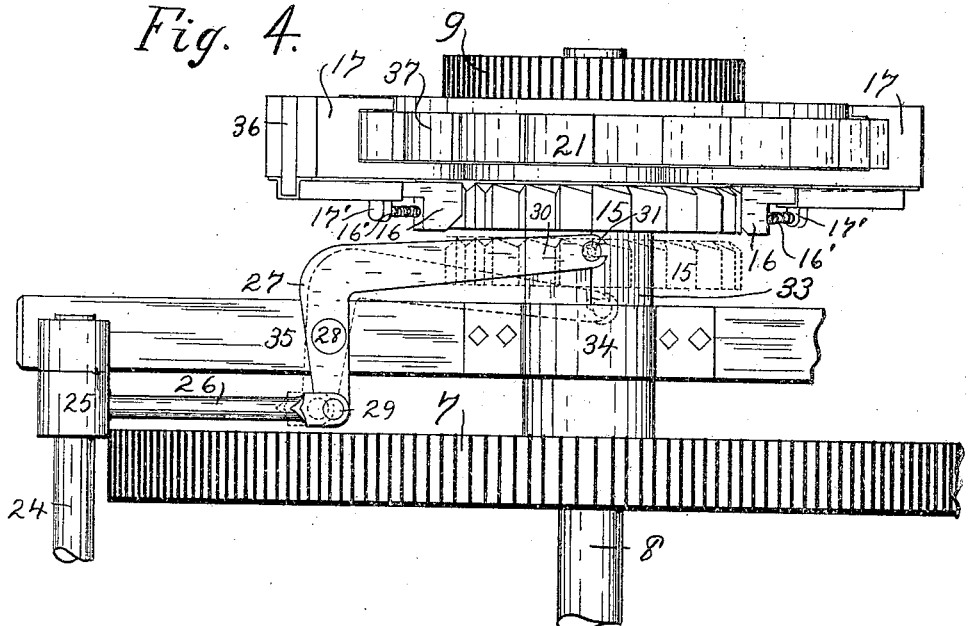
Figure 5:
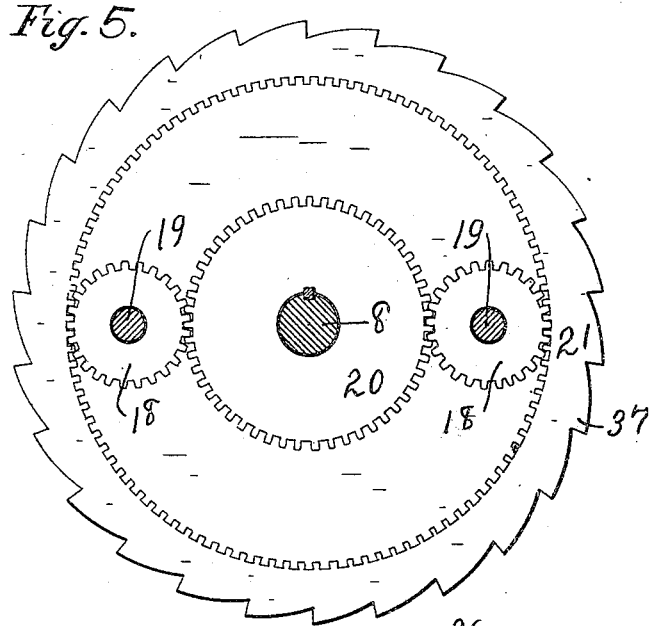
Figure 6:
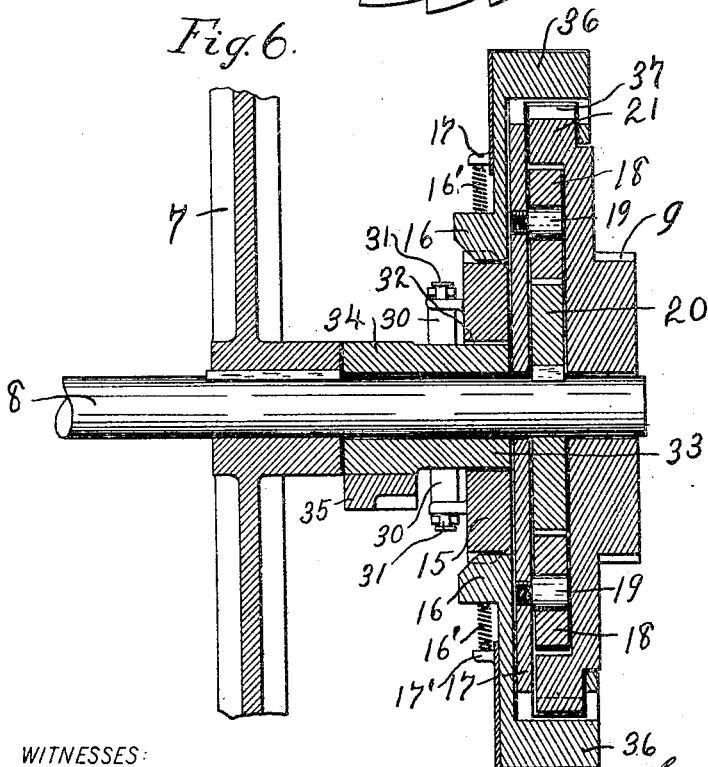

Figure 1 represents a side view. Fig. 2 represents a top view. Fig. 3 represents a side view of the clutch mechanism by which the direction of the vehicle is reversed. Fig. 4 represents a top view of the device shown in Fig. 3. Fig. 5 is a detail showing the mechanism for communicating motion from the driving-shaft to the inclosing gear mechanism, and Fig. 6 represents a vertical section drawn on line *x x* of Fig. 5.

Like parts are identified by the same reference characters throughout the several views.

Motion is communicated from the piston within the cylinder 1 of the engine to the respective traction-wheels 2 through the pitman 3, crank 4, crank-shaft 5, pinion 6, gear-wheel 7, wheel-supporting shaft 8, pinions 9 9, and gear-wheels 10 10, said gear-wheels 10 being respectively connected with the respective traction-wheels 2 by a plurality of fastening-clamps 11. The traction-wheels 2 are mounted upon the vehicle-axle 12, and said axle is connected with the frame of the vehicle 13 in the ordinary manner. 14 is a fly-wheel of the engine, which is supported from the shaft 5.

It will be understood that when the engine is being driven forwardly, the fly-wheel 14 being driven in the direction indicated by the arrow, a forward motion will be communicated to the vehicle. When, however, it is desirous to reverse the direction of the vehicle without stopping or changing the movement of the engine, a reverse movement is communicated to the traction-wheels 2 from the shaft 8 by throwing the non-revoluble ratchet-wheels 15 15 from the position indicated by dotted lines in Fig. 4 into engagement with the pawls 16 16, as shown in Figs. 2, 3, and 4, whereby the revolving movement of the pawls 16 and their supporting-arms 17 17 will be brought to rest. 16' is a spring by which said pawl is retained in contact with the teeth of the ratchet, one end of said springs being supported from a stationary bracket 17' and the other end adapted to bear against a projecting shoulder of said pawl, and whereby the pinions 18 18, which are supported by said arms and which are adapted to revolve with said arms 17 when said arms revolve, are caused to rotate on their supporting-trunnions 19 by the action of the gear-wheel 20, whereby the large ratchet-wheel 21 is revolved in the opposite direction from the driving gear-wheel 20 and its supporting-shaft 8, with which said gear-wheel 20 is keyed and revolves, and whereby a reverse movement is communicated to the traction-wheels 2 from said large ratchet-wheel 21 through the pinion 9 and gear-wheel 10, thereby causing the vehicle to be reversed or moved backwardly. Motion is communicated to the non-revoluble ratchet-wheels 15 from the operating-handle 23 through the shaft 24, arm 25, link 26, and elbow crank-lever 27, said elbow crank-lever 27 being pivotally connected with the side bars 35 by the bolt 28 and with the link 26 by the bolt 29. The long arm of the elbow crank-lever 27 terminates in two branches 30, which are pivotally connected with the ratchet-wheel 15 by the bolts 31. The non-revoluble ratchet-wheel 15 is provided at its center with a rectangular aperture 32, which is slidably supported upon the stationary block 33, which block 33 permits of the required lateral movement of said ratchet-wheel, while it prevents the latter from turning upon its central axis. The block 33 is formed integrally with the journal-boxes 34 and are supported from the side bars 35 of the frame. It will be understood that when the ratchet-wheel 15 is thrown into engagement with the pawls 16 said pawls will be thrown outwardly by contact with said ratchet-wheel, whereby the horizontal arms 36 of said pawls will be thrown out of engagement with the teeth 37 of said large ratchet-wheel 21, whereby said ratchet-wheel is free to revolve in the opposite direction independently of said pawls and pawl-supporting arms. Thus it will be understood that while the shaft 8, gear-wheel 7, and all the parts communicating between said shaft and the engine always move in the same direction regardless of the position of the clutch mechanism all the other moving parts communicating between said shaft 8 and the driving-wheels are reversed the instant that the non-revoluble ratchet-wheels 15 are thrown into engagement with the pawls 16 and that as soon as said ratchet-wheels are thrown out of engagement with said pawls 16 the parts communicating between the shaft 8 and the traction-wheels will be caused to resume their former movement, whereby the vehicle will be driven forwardly. The operating-lever 23 is locked at the desired point of adjustment for driving the vehicle forwardly or backwardly in any convenient manner. It will be understood that by this arrangement when the vehicle is being driven in a circular course the traction-wheel described in the larger circle of the course over which it is driven will be caused by frictional contact with the surface to revolve faster than the inner traction-wheel which is propelling the vehicle, and when the traction-wheel is being so driven it will carry with it the pinion 9, ratchet-wheel 21, pawls 16, pinions 18, and the pawl-supporting arms 36, all of which parts are free to move with said traction-wheel independently of the supporting-shaft 8. Thus it is obvious that neither driving-wheel will be caused to slide upon the surface as the vehicle is being driven around a circle by the action of the other, as both of said driving-wheels are, as stated, free to revolve faster than the driving mechanism which operates them, independently of the other driving-wheel.

Having thus described our invention, what we claim as new, and desire to secure by Letters Patent, is—

1. The combination with the traction-wheel of a motor-driven vehicle, of a driving-shaft; a driving gear-wheel fast thereon; a ratchet-wheel loose on the shaft an internal gear carried by said wheel; a pinion fast on the ratchet-wheel a gear-wheel fast on the traction-wheel; a rotary gear-carrier loose on the shaft an intermediate pinion carried by said carrier in mesh with the driving gear-wheel and the internal gear of the ratchet-wheel; means for both locking said carrier against movement in one direction; and against relative movement on the ratchet-wheel in the other direction.

2. The combination with the traction-wheel of a motor-driven vehicle; of a driving-shaft; a driving gear-wheel fast thereon; an intermediate gear-carrier; pinions mounted thereon in mesh with the driving gear-wheel; an internal gear-wheel; a pinion connected therewith; motion-transmitting connections between the pinion and traction-wheel; means for both locking said gear-carrier positively against movement in one direction and against relative movement along the internal gear-wheel in the opposite direction.

3. The combination with the traction-wheel of a motor-driven vehicle; of a driving-shaft; a driving gear-wheel fast thereon; a gear-carrier loose on the shaft; a pinion on said carrier in mesh with the driving-gear; an internal gear-wheel loose on the shaft and in mesh with said pinion; motion-transmitting connections between the internal gear-wheel and said traction-wheel; a non-rotatable member; and latch connections on the gear-carrier adapted for alternate engagement with the stationary member, and the internal gear-wheel.

4. The combination with the traction-wheel of a motor-driven vehicle; of a driving-shaft; a driving gear-wheel fast thereon; a gear-carrier loose on the shaft; a pinion on said carrier in mesh with the driving-gear; an internal gear-wheel loose on the shaft and in mesh with said pinion; motion-transmitting connections between the internal gear-wheel and said traction-wheel; a non-rotatable member; and latch connections on the gear-carrier adapted for alternate engagement with the stationary member, and the internal gear-wheel, said latch connections being adapted to permit movement of the gear-carrier in a direction opposite to the movement of the internal gear-wheel in any position of adjustment.

In testimony whereof we affix our signatures in the presence of two witnesses.

HUBERT A. KISER.
CHRISTIAN P. ANDERS.

Witnesses as to signature of Hubert A. Kiser:
LEVERETT C. WHEELER,
H. Z. TAUGHER.

Witnesses as to signature of Christian P. Anders:
HENRY L. JEFFRIES,
ANDREW FEENEY.